United States Patent [19]
Simons et al.

[11] Patent Number: 6,115,051

[45] Date of Patent: *Sep. 5, 2000

[54] ARC-LENGTH REPARAMETERIZATION

[75] Inventors: David P. Simons, Lynnfield, Mass.; Scott S. Snibbe, Seatle, Wash.

[73] Assignee: Adobe Systems Incorporated, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/693,942

[22] Filed: Aug. 7, 1996

[51] Int. Cl.[7] .................................................. G06T 11/00
[52] U.S. Cl. ............................................. 345/442; 345/473
[58] Field of Search .................................... 345/442, 443, 345/474, 475, 959, 949

[56] References Cited

U.S. PATENT DOCUMENTS

| | | | |
|---|---|---|---|
| 4,674,058 | 6/1987 | Lindbloom et al. ..................... | 345/441 |
| 5,253,336 | 10/1993 | Yamada ................................... | 345/442 |
| 5,309,521 | 5/1994 | Matsukawa .............................. | 345/131 |
| 5,317,650 | 5/1994 | Harrington .............................. | 382/199 |
| 5,341,317 | 8/1994 | Takahashi et al. ..................... | 364/720 |
| 5,363,479 | 11/1994 | Olynyk ................................... | 345/442 |
| 5,408,598 | 4/1995 | Pryor, Jr. ................................. | 345/442 |
| 5,412,770 | 5/1995 | Yamashita et al. ..................... | 345/442 |
| 5,473,742 | 12/1995 | Polyakov et al. ....................... | 345/442 |
| 5,500,927 | 3/1996 | Sander-Cederlof et al. .......... | 345/433 |
| 5,638,503 | 6/1997 | Hoel ....................................... | 345/442 |
| 5,692,117 | 11/1997 | Berend et al. .......................... | 345/442 |
| 5,694,535 | 12/1997 | Broekhuijsen ......................... | 345/442 |
| 5,717,848 | 2/1998 | Watanabe et al. ..................... | 345/474 |
| 5,731,820 | 3/1998 | Broekhuijsen ......................... | 345/442 |

OTHER PUBLICATIONS

Webster's II, New Riverside University Dictionary, p. 104, 1984.

Watt and Watt, Advanced Animation and Rendering Techniques, Theory and Practice, pp. 345–356, 1992.

Guenter and Parent, "Computing the Arc Length of Parametric Curves" IEEE Computer Graphics & Applications, vol. 10, issue 3 (May 1990), pp. 72–78.

Michael McCool, "CS488/688 Introduction to Computer Graphics Spring 1995" University of Waterloo, Department of Computer Science.

Michael McCool, "CS488/688 Introduction to Computer Graphics Spring 1998" University of Waterloo, Department of Computer Science.

Hearn and Baker, "Computer Graphics 2nd Ed." Prentice–Hall (1994), pp. 320–355.

Foley and van Dam, "Computer Graphics: Principles and Practices 2nd Ed." Addison–Wesley (1992), pp. 1057–1070.

Barsky et al. " Geometric Continuity of Parametric Curves: Three Equivalent Characterizations," IEEE Computer Graphics & Applications, Nov. 1989, pp. 60–68.

Barsky et al. " Geometric Continuity of Parametric Curves: Constructions of Geometrically Continuous Splines," IEEE Computer Graphics & Applications, Jan. 1990, pp. 60–68.

"Recursive Spline Curve Fitting," IBM Technical Bulletin, vol. 36, No.12, Dec. 1993, 493–495.

Guang Yu, To Accurately Control the Speed of Motion along Parameterized Space Curves—Principle and Application of a New Algorithm in CAM/CNN and Robotics.

Snibbe, . et al., "A Direct Manipulation Interface for 3D Computer Animation," *Eurographics* vol.14, No.3, 13 pgs., 1995.

*Primary Examiner*—Mark K. Zimmerman
*Assistant Examiner*—Albert K. Lee
*Attorney, Agent, or Firm*—Fish & Richardson P.C.

[57] ABSTRACT

A computer-implemented method and apparatus for reparameterizing a parametric function representing an animation feature in an animation system where the parametric function is represented by a curve having unequal arc-length per unit parameter. The system samples at intervals of the parameter along the length of the curve and then calculates the arc-length over each interval. Thereafter, one or more differentiable curves are fitted to the parameter, arc-length pairs.

24 Claims, 4 Drawing Sheets

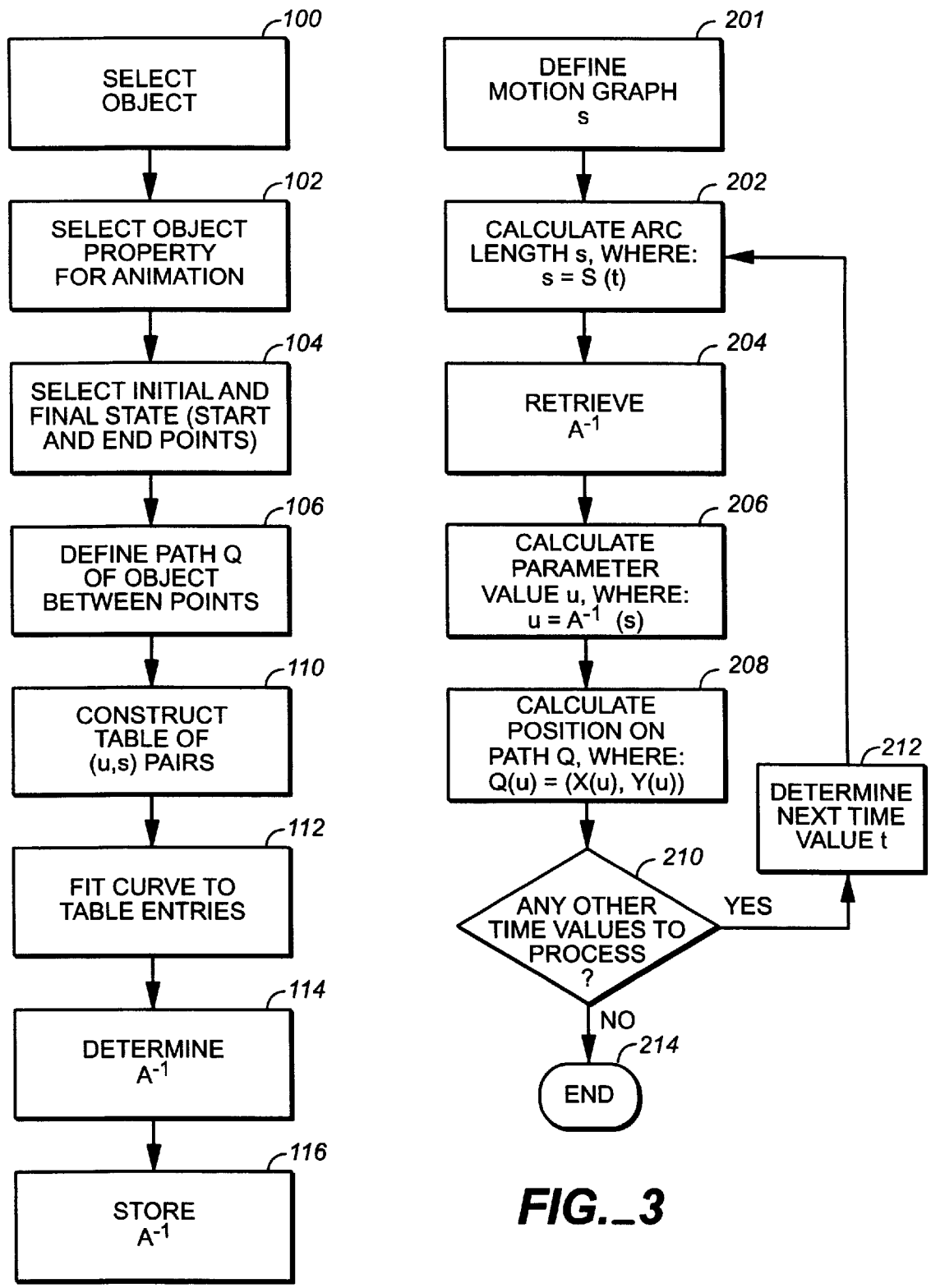
FIG._1
FIG._3

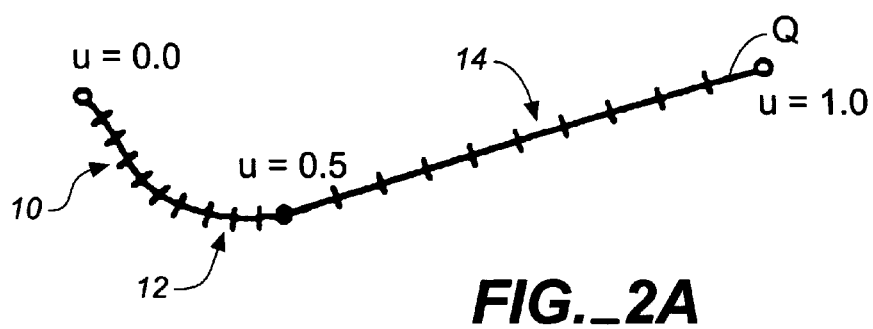
FIG._2A
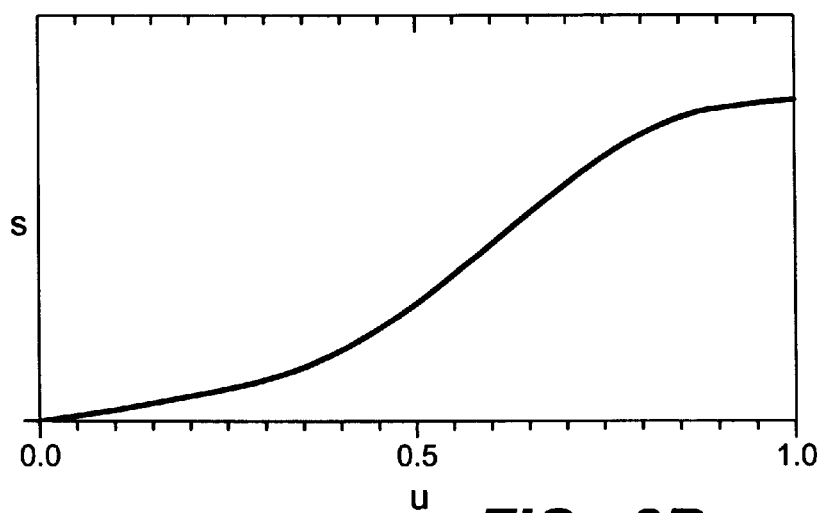
FIG._2B
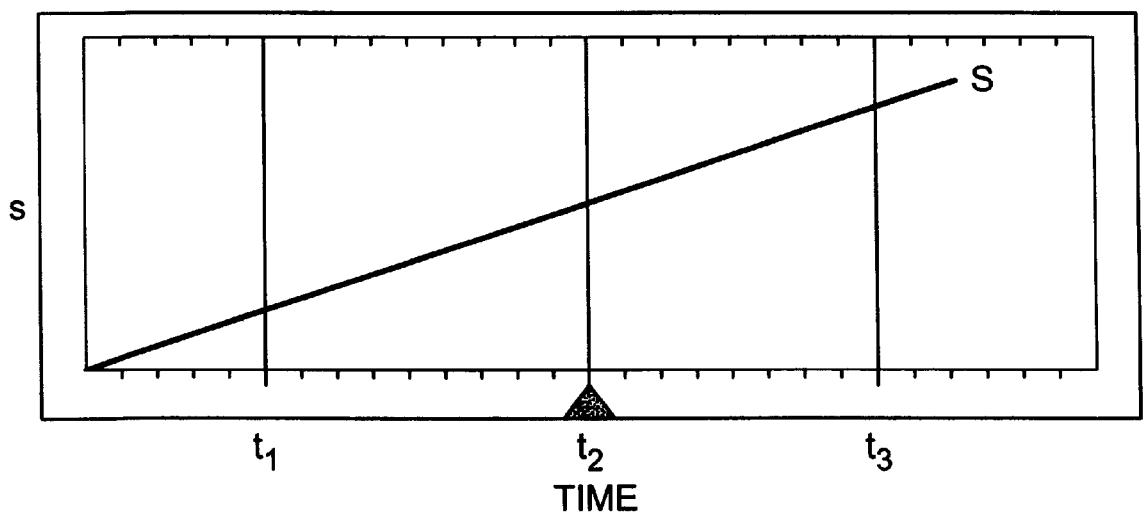
FIG._2C

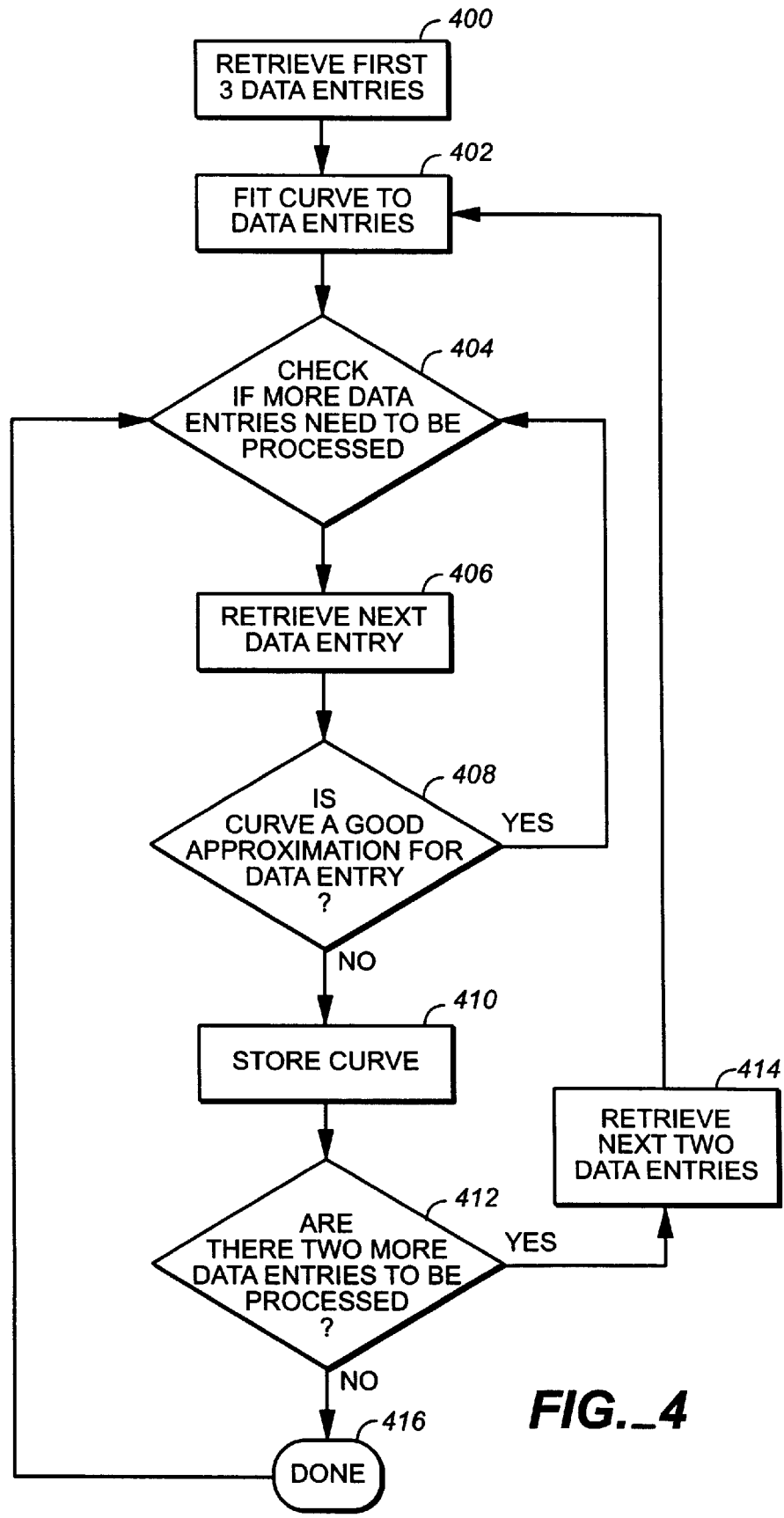
FIG._4

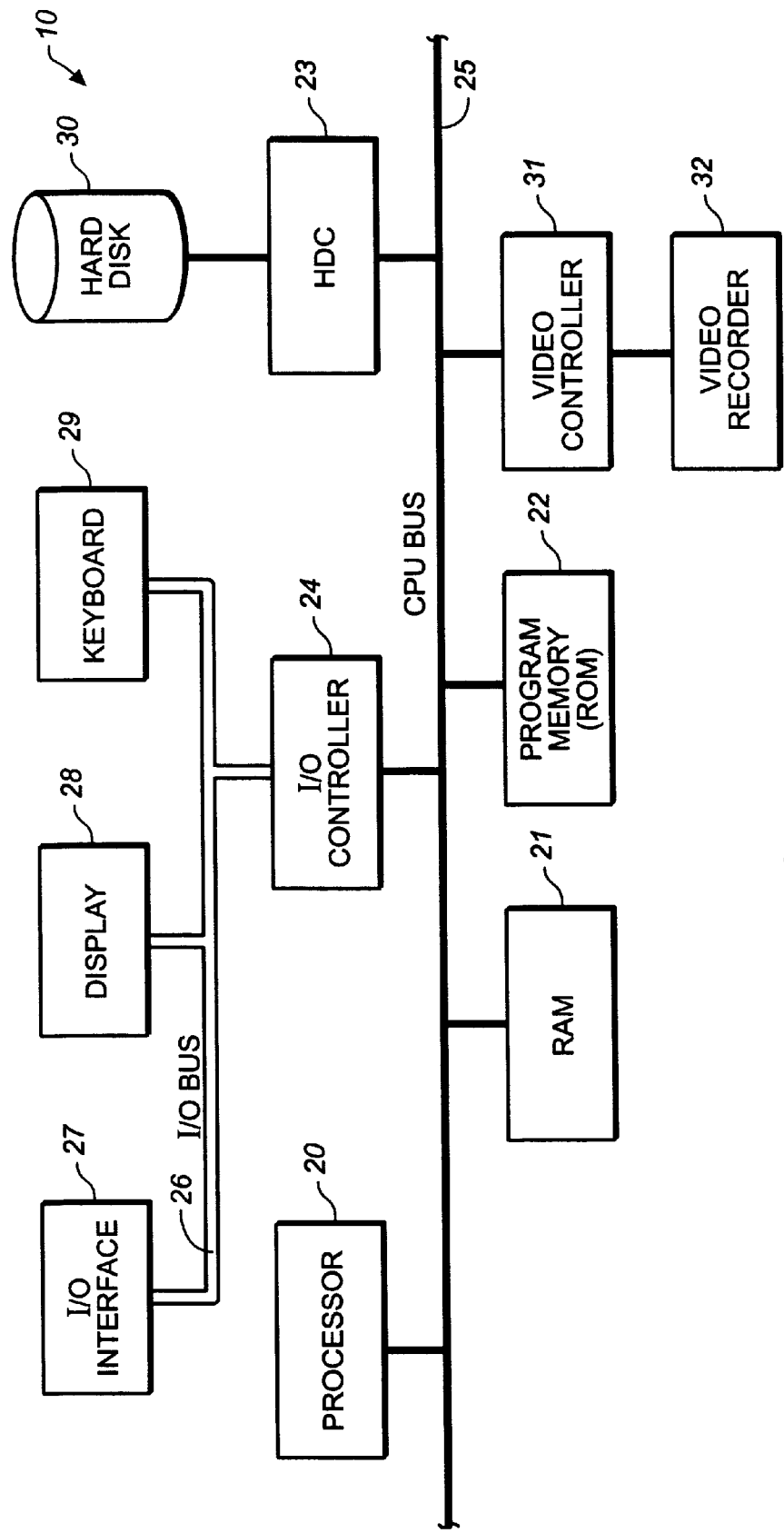
FIG._5

ARC-LENGTH REPARAMETERIZATION

BACKGROUND

The present invention relates generally to methods and apparatus for animation in a movie system and more particularly to a method and apparatus for smoothing animation effects by compensating for arc-length variations in motion as an object travels along a path.

Programmed computers can be used to edit and create movies. For example, a computer program product called After Effects, available from Adobe Systems Incorporated of Mountain View, Calif., is licensed for use on a variety of personal computers and provides its user the ability to edit and create movies by integrating and arranging pieces of footage. In such programs, the process of creating a movie typically occurs in two major stages: modeling and rendering.

Modeling is the process of creating the structure for a movie project, commonly called a "composition", by defining the arrangement and timing of imported footage. A composition is essentially a set of instructions that define the processing of footage pieces in space and time in the formation of a movie. Each composition typically includes the definition of one or more layers, which are place holders for pieces of footage. Modeling includes the subprocesses of importing footage into the layers in a composition, editing the footage, arranging or "compositing" the various pieces of footage, and adding animation or other effects to the composition layers.

Imported footage may be in the form of video, pictures, animations, drawings, stills, photographs or computer generated images. Each piece of imported footage is assigned to a layer. Compositing integrates or combines the footage of the respective layers by using geometry masks, transparency information and effects. As the layers of the composition are integrated in the composition, animation and other effects are applied to each layer.

To create a final output, such as a film or videotape for viewing, the composition must be rendered. The rendering process transforms the footage and instructions associated with each layer into finished video frames. During the rendering process, corresponding pixels from each layer are composited on top of each other to create a final image, a frame at a time, in the output format requested by the user. The frames may then be written for either analog or digital storage on a recording device such as a video tape recorder, photographic film recorder or digital disk recorder. In this way a movie is produced.

Animation, as described above, is a subprocess of the modeling stage. Animation techniques allow a user to create apparently spontaneous, lifelike movement of objects in the composition. Most movie systems allow a user to animate an object (i.e., a layer) by specifying a path of the object as it moves through a two- or three-dimensional space. The path is typically represented as a spline curve Q. Motion along this spline curve Q may then be described by a single function (e.g., u as a function of time, where u is the natural parameter of the function defining Q)

SUMMARY OF THE INVENTION

In general, in one aspect, the invention provides a computer-implemented method and apparatus for reparameterizing a parametric function representing an animation feature in an animation system where the parametric function is represented by a curve having unequal arc-length per unit parameter. The system samples at intervals of the parameter along the length of the curve and then calculates the arc-length over each interval. Thereafter, one or more differentiable curves are fitted to the parameter, arc-length pairs.

In one embodiment, the reparameterization method may be used for smoothing animation of an object as it moves along a path in a display space in an animation system.

Advantages of embodiments of the invention include the following. Application of the present invention requires a minimum of storage space for mapping the parameter value u to an arc-length s. In addition, first order continuity is provided by the reparameterization function $A^{-1}$, which maps a continuous function to the (u,s) pairs.

Other advantages and features will be apparent from the following description and from the claims.

BRIEF DESCRIPTION OF THE DRAWINGS

FIG. 1 is a flow chart for a reparameterization method according to the present invention.

FIG. 2a is a graph of an illustrative spline curve Q having even parametric intervals defining the motion of an object in a display area.

FIG. 2b is a graph of parameter value u versus actual distance traveled along the curve Q of FIG. 2a.

FIG. 2c is a graph of the velocity of an object along curve Q.

FIG. 3 is a flow chart of a method of determining the position of an object along a path Q for a time t.

FIG. 4 is a flow chart of a method of fitting a plurality of curves to data entries in a table according to the present invention.

FIG. 5 is a schematic block diagram of a programmable computer suitable for executing computer programs according to the present invention.

DETAILED DESCRIPTION

Referring to FIG. 1, in a process of animating an object in a composition, a user selects (100) an object, such as a layer in a movie composition, for animation. The user then designates (102) the particular object property to be animated. Object properties that may be animated include layer position, anchor point, effect point controls and color selection. For example, the animation of a layer's position property allows a user to move the layer across the display area. For the sake of clarity, the present invention will be described in terms of animating a single property, namely position. However, the reparameterization process may also be applied to the animation of other properties having separate temporal control such as anchor point, effect point controls and color selection.

The user defines (104) an initial object property state and a final object property state, such as starting and ending positions of the object as it travels in the display area. The starting or ending positions may reside outside the display area to allow for the entry or exit of the object into or from the display area.

The user defines (106) a path Q in the property space, that the object will follow between the starting and ending property states. In one embodiment, the path is defined by a curve function Q(u) which determines the location of the object on path Q. The curve may be of the form of a cubic spline, a fourth-order spline, a Bezier spline, a Hermite spline, or a concatenation of splines. For two-dimensional position space, function Q(u) can be expressed in the following form:

$$Q(u)=(x(u),y(u)) \qquad (1)$$

Normally, the user specifies such a function by manipulating control points of a graph of the function through a graphical user interface. For example, the function may be of the form of a Bezier curve having associated therewith control points for manipulating the curve between starting and ending property states in the display space.

However, equal steps in the parameter u may result in unequal distances s traveled along the spline curve Q. Referring to FIG. 2a, a graph of a 3 point spline curve Q is shown with tick marks at even parametric intervals. FIG. 2b is a graph of parameter value u versus actual distance s (measured in display space) along the spline curve Q. FIG. 2c is a graph of the motion along the path Q expressed as arc-distance versus time. An object traveling along path Q (FIG. 2a) according to the motion graph (FIG. 2c) will appear to have velocity changes at points 10, 12 and 14 (FIG. 2a). This is due to the unequal steps of arc-length s along the curve Q with respect to the parameter u. Accordingly, the shape of the curve Q and the spacing of its control points may result in apparent motion (in the case of a position parameter, apparent velocity) to a viewer. This problem is addressed by reparameterizing the spline Q by arc length, where equal steps of an arc-length parameter s map to equal distance measured in display space along a spline curve Q.

It is generally desirable to decouple motion along path Q from spatial position. Motion is generally described in a motion graph S which maps a time to a distance traveled on path Q. For example, where the motion along the path is expressed in terms of velocity (for animation of a position parameter), the user may choose to have a linear velocity along all points of path Q. Alternatively, a user may desire that the object's velocity vary over the length of the path (e.g., slow at the beginning of the path and then fast at the end of the path so as to simulate acceleration of the object along the path). In one embodiment, the motion graph is a one dimensional function S over time, where the distance s (arc distance or arc-length) traveled along the path Q may be described for any time t as:

$$s=S(t) \qquad (2)$$

The path Q is parameterized by its natural parameter u. The motion graph S defines a distance traveled in terms of an arc length s. In order to parameterize a spline curve Q by arc-length, a formulation for the arc-length s along the original curve Q(u) with respect to the original parameter u is derived. The arc-length s for the curve Q(u) is formally expressed as:

$$s=A(u) \qquad (3)$$

where A is a function for determining the arc-length at all parameter values u.

A segment of arc-length ds between points Q(u) and Q(u+du) is defined by the equation:

$$ds = \sqrt{dx^2 + dy^2} \qquad (4)$$
$$= \sqrt{\left(\frac{dx}{du}\right)^2 + \left(\frac{dy}{du}\right)^2}\, du$$

To determine the arc-length from the start of the curve to a point at parameter value u, equation (4) is integrated resulting in:

$$s = \int_0^u \left(\left(\frac{dx}{du}\right)^2 + \left(\frac{dy}{du}\right)^2\right)^{1/2} du \qquad (5)$$

There is no general analytic expression for this integral, so it is evaluated using numerical techniques.

The system constructs a table $T_A$ comprising (u,s) pairs by sampling at even intervals of u along the entire curve Q (110). For a given value of u, the system calculates an arc length s measured from the beginning of curve Q (u=0) by summing arc-length segments calculated using Equation 4. In one embodiment, a recursive sub-division algorithm is used to determine the sampling points along the spline as opposed to an even sampling interval. In a recursive sub-division process, the spline is divided recursively into smaller sections until the arc distance between sample points falls beneath a user specified arc-distance threshold level. Accordingly, portions of the spline may include a higher density of sample points than others.

As described above the function A may be used to determine the arc-length s at all points u according to Equation (3). The system fits (112) a curve to the data points stored in table $T_A$ to derive an approximation for function A. In one embodiment, the curve is a 2-dimensional curve, and more particularly a Bezier curve, evaluated as a one-dimensional function. Alternatively, a series of Bezier curves may be used to approximate function A as is described below in reference to FIG. 4.

The curve derived from table $T_A$ of (u,s) pairs is used to map a value of u to an arc-length s. The curve represents the reparameterizing of spline Q by arc-length. Now, equal steps of the arc-length parameter s, map to equal distance traveled along the curve Q.

For every value of u, there exists a singular value s, as defined by the function A. Function A is one-to-one and the inverse function $A^{-1}$ is determinable. The inverse function $A^{-1}$ is determined (114) and stored (116) for use in determining the position of an object on path Q for any time t. The inverse function $A^{-1}$ is referred to as the reparameterization function. Table $T_A$ may be used to construct either function A or $A^{-1}$ depending on the application (either mapping the parameter value u to an arc-length s, or alternatively mapping an arc-length s to a parameter value u). In one embodiment, a single approximation of either function A or $A^{-1}$ is stored, from which the inverse is derived.

Referring to FIG. 3, the position on the path Q at a time t is determined by using the reparameterization function $A^{-1}$ to compensate for arc-length variations and achieve motion in accordance with the motion defined by a motion graph S.

In a process for controlling the motion of an object along path Q, the user defines a motion graph S (201). Thereafter, the system determines the position of an object on path Q at a time t by calculating (202) an arc-length s (traveled from a start point on path Q) according to the formula:

$$s=S(t) \qquad (6)$$

The system retrieves (204) the reparameterization function and applies (206) it to the calculated arc-length s to calculate a parameter value u according to the formula:

$$u=A^{-1}(s) \qquad (7)$$

The system then calculates (208) the position along path Q for the parameter u according to the formula:

$$Q(u)=(x(u),y(u)) \qquad (8)$$

The object may then be moved to its appropriate position on path Q for the designated time t. The process may be repeated for any time t as the object travels between starting and ending points along path Q. Accordingly, the system may check (210) to determine if any other time values need to be processed (210)(e.g. has the object reached the end point yet). If so, then a next time value is determined (212), and the next position for the object on path Q is determined by repeating steps 202 through 208. Alternatively, the process ends (214).

This technique requires a minimum of storage space for mapping the parameter value u to an arc-length s. In addition, first order continuity is provided by the reparameterization function $A^{-1}$, which maps a continuous function to the (u,s) pairs. In one embodiment, by using the reparameterization function an accurate graph of velocity vs. time (velocity graph) may be provided to the user. An editable velocity graph is a simple tool for controlling the motion of an object along a path which allows the user to directly manipulate the speed of the object at various points along the path. The use of a continuous function to approximate the mapping from a parameter value u to an arc-length s, allows for accurate editable control of object motion that accounts for arc-length variances per unit parameter. Accordingly, when the user animates a position parameter (as described above), the velocity of the object as it travels along a path Q is based on a smooth function resulting in animation that appears smooth to the viewer. The use of a smooth function is necessary to accommodate the sensitivities of human visual perception to movement in visual display applications.

As was described above, fitting a curve to the (u,s) pairs provides an approximation of function A which maps a value of u to an arc-length s. Alternatively, a more exact approximation for function A may be derived by fitting multiple contiguous curves to the (u,s) pairs stored in table A. Referring now to FIG. 4, in a method for fitting a plurality of curves to data entries in a table, the system retrieves (400) the first three entries in table A. The system fits (402) a curve (curve$_1$) to the three data entries ((u,s) pairs). In one embodiment, the curve is a 2-dimensional curve, and more particularly a Bezier curve, evaluated as a one-dimensional function.

Thereafter, the system checks (404) to determine if more data entries are to be processed. If not, the process is complete (416). If so, then the system retrieves (406) a next data entry (new data) from table $T_A$. The system checks (408) the accuracy of the approximation curve (in this case curve$_1$) for the new data. If the new data falls on the curve or within a predetermined error distance from the curve, then the curve approximation is valid for the new data, and a check at step 404 is repeated to determine if there are anymore data entries to process. If not, then the process is complete. If so, then the next table entry is retrieved repeating steps 406 and 408 for the new data.

If the new data does not fall on the curve or within a predetermined error distance from the curve, then a new curve segment is constructed. First, the system stores (410) the old curve (in this case curve$_1$). The system then checks (412) to determine if two more data entries in table $T_A$ need to be processed. If so, the system retrieves (414) the next two data entries from table $T_A$ for a total of three data entries, and continues the process at step 402 until done.

If less than two data entries are available, the process terminates. Alternatively, if one more data point is available, a final curve (straight line) may be constructed from the last two data points.

Alternatively, a recursive multiple curve approximation process may be used. Specifically, a single curve is fitted to the table $T_A$ of (u,s) pairs. The system then checks to determine the maximum difference between the sample points (the (u,s) pairs) and the generated curve. If the maximum difference between any of the pairs and the generated curve does not exceed a predetermined threshold, then the single curve approximation is sufficiently accurate, and the curve is stored. Alternatively, the data entries in the table $T_A$ are subdivided at the point of greatest difference and a curve is fitted to each portion of the subdivided table $T_A$ entries. The system again checks for each sub-division for the maximum difference between any of the pairs in the sub-division and the generated curve. The process may be repeated as required, dividing the table $T_A$ into smaller and smaller sub-divisions, until the maximum difference for all the fitted curves applied to their respective sub-division is less than the predetermined threshold. Thereafter, the sequence of curves may be stored.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, FIG. 5 shows a block diagram of a programmable processing system 10. Programmable processing system (computer) 10 preferably includes a processor 20, random access memory (RAM) 21, a program memory 22 (preferably a writable read-only memory (ROM) such as a flash ROM), a hard drive controller 23, video controller 31 and an input/output (I/O) controller 24 coupled by a CPU bus 25.

Hard drive controller 23 is coupled to a hard disk 30, which may be used for storing application programs, such as After Effects, and data. Video controller 31 is coupled to video recorder 32, which may be used for storing and importing video footage and for writing final output. I/O controller 24 is coupled by means of an I/O bus 26 to an I/O interface 27. I/O interface 27 receives and transmits data in analog or digital form over communication links such as a serial link, local area network, wireless link, and parallel link. Also coupled to I/O bus 26 is a display 28 and a keyboard 29. Alternatively, separate connections (separate buses) may be used for I/O interface 27, display 28 and keyboard 29. Programmable processing system 10 may be preprogrammed or it may be programmed (and reprogrammed) by downloading a program from another source (e.g., a floppy disk, CD-ROM, or another computer).

Each computer program is preferably stored in a storage media or device (e.g. program memory 22 or magnetic disk) readable by a general or special purpose programmable computer, for configuring and operating a computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The present invention has been described in terms of specific embodiments. The invention, however, is not limited to these specific embodiments. Rather, the scope of the invention is defined by the following claims, and other embodiments are within the scope of the claims. For example, the present invention has been described in terms of animating the position of an object in display space. The principles of the present invention are equally applicable to other animation features including mask shape, 3D object transformation and animatable n-dimensional properties, such as color selection, layer anchor point and effect point controls. In addition, the present invention has been described in terms of two-space representations. The principles of the present invention are equally applicable to three- or more space representations. In another example, the present invention has been described in one embodiment as a method of determining the position of an object along a path at a time t. Alternatively, the principles of the present invention may be used to precisely locate objects at even distances along a path for use in drawing or pixel-layout programs. In these systems, rather than solving Equation for u using the reparameterization function $A^{-1}$, we solve for s and use the approximation of function A for a given parameter value of u. Similarly, other uses of the reparameterization function $A^{-1}$ and its inverse A, may be found. For example, the reparameterization function $A^{-1}$ may be used in conjunction with the principles of the present invention to measure arc-lengths (distance) traveled along a spline in a computer-aided design or architecture program.

What is claimed is:

1. A computer-implemented method of reparameterizing a parametric function of a formal parameter that defines a curve representing an animation feature in an animation system, comprising the steps of:

sampling the formal parameter along a length of the curve;

at each sample point, calculating the arc-length to determine (sample, arc-length) pairs;

fitting a differentiable curve to the (sample, arc-length) pairs; and deriving from the fitted differentiable curve a first-order continuous reparameterization function of arc-length that can be evaluated analytically to determine the formal parameter value at any arc-length.

2. The method of claim 1 wherein the reparameterization function represents a 2-dimensional Bezier curve.

3. The method of claim 1 wherein the differentiable curve is comprised of a plurality of Bezier curves.

4. The method of claim 3 wherein the step of curve fitting further comprises the steps of characterizing a first set of pairs using a first Bezier curve to approximate the changes in arc-length over time for a series of contiguous pairs until the first Bezier curve approximation exceeds a predetermined error, and curve fitting over a next set of pairs by using a second Bezier curve to approximate the change in arc-length over time for a second series of contiguous pairs until the second Bezier curve approximation exceeds a predetermined error.

5. The method of claim 3 wherein the step of curve fitting further comprises the steps of:

characterizing the changes in arc-length over time for all (sample, arc-length) pairs using a first Bezier curve;

determining the maximum difference between the first Bezier curve and any of the (sample, arc-length) pairs;

if the maximum difference exceeds a predetermined difference level, dividing the (sample, arc-length) pairs at the point of greatest difference and characterizing the changes in arc-length over time for each sub-divided portion of (sample, arc-length) pairs using a second Bezier curve.

6. The method of claim 1 where the parametric function is selected from the group consisting of a cubic spline, a fourth-order spline, a Bezier spline, a Hermite spline, and a concatenation of splines.

7. The method of claim 1 where the animation feature is motion in a space selected from the group consisting of a two-dimensional position space, a three-dimensional position space, and color space.

8. The method of claim 1 where the animation feature is selected from the group of mask shape, 3D object transformation and animatable n-dimensional properties.

9. The method of claim 1 where the arc-length of the curve is not proportional to the formal parameter.

10. The method of claim 1 where the sampling is done at regular intervals of the formal parameter.

11. The method of claim 1 where the sampling is done by recursive sub-division until the arc-length between samples is less than a predetermined distance.

12. A computer-implemented method of smoothing animation of an object as it moves along a path in a display space in an animation system, where the path is described by a parametric curve function that defines a curve representing an animation feature, comprising the steps of:

defining a motion of the object along the path as a function of distance along the path versus a time t;

reparameterizing the curve to derive a first-order continuous reparameterization function of arc-length that can be evaluated analytically to determine the motion along the curve, where equal steps of the arc-length parameter of the reparameterization function map to equal distances traveled along the curve; and evaluating the reparameterization function to determine the position of the object along the path for any time t.

13. The method of claim 12 wherein the reparameterization step further includes the steps of:

sampling the parameter along the length of the curve;

at each parameter sample point, calculating the arc-length to determine a (sample, arc-length) pair; fitting a differentiable curve to the (sample, arc-length) pairs; and deriving a first-order continuous reparameterization function from the fitted differentiable curve.

14. The method of claim 12 where the animation feature is motion in a space selected from the group consisting of a two-dimensional position space, a three-dimensional position space, and color space.

15. The method of claim 12 where the animation feature is selected from the group of mask shape, 3D object transformation and animatable n-dimensional properties.

16. A computer program, residing on a computer-readable medium, comprising instructions for causing a computer to:

receive two end points in a display space and a definition of a path between the end points represented by a curve defined by a parametric function Q(u) of a formal parameter u, the curve representing an animation feature in an animation system;

define a motion between the two points as a function s=S(t) of distance s traveled along the path versus a time t;

reparameterize the curve to derive a first-order continuous reparameterization function of arc length s that can be evaluated analytically to determine the motion between the two end points along the curve, where equal steps of the arc-length parameter s map to equal distance traveled along the curve; and evaluate the reparameterization function to determine the position of the object along the path for any time t.

17. A computer-implemented method of determining the location of an object at a time t as it travels along a path Q in an animation system, comprising the steps of:

defining the path Q between two end points represented by a curve defined by a parametric function Q(u) representing an animation feature in an animation system;

defining a motion between the two points as a function S of time;

selecting sample points at parameter values u along the length of the curve and for each sample point calculating an arc-length s along the curve to calculate (u, s) pairs fitting a differentiable curve to the (u, s) pairs;

deriving a first-order continuous function A that can be evaluated analytically, where s=A(u);

inverting the function A to derive an inverted function $A^{-1}$;

calculating an arc-length traveled for a time t by function S;

calculating a parameter u according to the formula $u=A^{-1}(s)$; and calculating the position on the path Q using the calculated parameter u according to the parametric function Q(u).

18. A computer-implemented method of placing objects along a path in a display space in an animation system, where the path is described by a parametric function that defines a curve representing an animation feature, comprising the steps of:

reparameterizing the curve to derive a first-order continuous reparameterization function of arc-length that can be evaluated analytically to determine the position of an object along the curve, where the reparameterization function maps equal steps of arc-length to equal distances traveled along the curve; and evaluating the reparameterization function to place objects at equal distances along the path for equal increments of arc-length.

19. The method of claim 18 wherein the reparameterization step further includes the steps of:

sampling the parameter along the length of the curve;

at each parameter sample point, calculating the arc-length to determine a (sample, arc-length) pair; and fitting a differentiable curve to the (sample, arc-length) pairs;

deriving a first-order continuous reparameterization function from the fitted differentiable curve.

20. The method of claim 18 where the step of placing objects includes the steps of determining the position along the path of each object by defining the arc-length spacing between objects and determining the position in display space according to the arc-length sensitive function.

21. The method of claim 18 where the objects are printed text.

22. A computer-implemented method of measuring arc-length along a path in a display space in an animation system, where the path is described by a parametric function that defines a curve representing an animation feature, comprising the steps of:

reparameterizing the curve to derive a first-order continuous function of arc-length that can be evaluated analytically including mapping equal steps of arc-length to equal distances along the curve; and evaluating the first-order continuous function to determine the arc-length of the curve at a given position on the path.

23. The method of claim 22 wherein the reparameterization step further includes the steps of:

sampling the parameter along the length of the curve;

at each parameter sample point, calculating the arc-length to determine (sample, arc-length) pairs; and fitting a curve to the (sample, arc-length) pairs;

deriving a first-order continuous function from the fitted curve.

24. The method of claim 22 wherein the step of determining the arc-length of the curve includes, the steps of:

calculating a parameter value u from the position; and determining the arc-length according to the the first-order continuous function.

* * * * *